(12) United States Patent
Viry

(10) Patent No.: US 9,098,484 B2
(45) Date of Patent: Aug. 4, 2015

(54) STRUCTURING AND EDITING A RECURSIVELY MULTI-DIMENSIONAL SPREADSHEET

(76) Inventor: Patrick Viry, Paris (FR)

( * ) Notice: Subject to any disclaimer, the term of this patent is extended or adjusted under 35 U.S.C. 154(b) by 645 days.

(21) Appl. No.: 13/465,034

(22) Filed: May 7, 2012

(65) Prior Publication Data

US 2013/0298002 A1  Nov. 7, 2013

(51) Int. Cl.
*G06F 3/00* (2006.01)
*G06F 17/24* (2006.01)

(52) U.S. Cl.
CPC ................... *G06F 17/246* (2013.01)

(58) Field of Classification Search
CPC ............ G06F 17/246; G06F 17/30592; G06F 17/30333
USPC .................. 715/212, 215, 234, 243, 254, 255
See application file for complete search history.

(56) References Cited

U.S. PATENT DOCUMENTS

| | | | |
|---|---|---|---|
| 7,155,667 B1* | 12/2006 | Kotler et al. | 715/210 |
| 7,305,408 B2 | 12/2007 | Morris | |
| 7,529,727 B2 | 5/2009 | Arning et al. | |
| 7,530,012 B2 | 5/2009 | Medicke et al. | |
| 2002/0091728 A1 | 7/2002 | Kjaer et al. | |
| 2003/0009649 A1 | 1/2003 | Martin et al. | |
| 2004/0210822 A1* | 10/2004 | Kotler et al. | 715/500 |
| 2010/0058163 A1* | 3/2010 | Garcia-Molina et al. | 715/220 |

\* cited by examiner

*Primary Examiner* — Kyle Stork
(74) *Attorney, Agent, or Firm* — Georgiy L. Khayet

(57) ABSTRACT

Methods for structuring electronic documents having an ordered set of cells (e.g., spreadsheets or web documents) are provided. In general, the methods provide for multidimensionality by allowing cells to be split by splitting operators, thus allowing cells to contain additional groups of cells, and recursively so. Disclosed are tools and operations for building and modifying various multi-dimensional structures and for interacting with them. Splitting operators provide a two-dimensional equivalent of lexical scopes and iterators in programming languages and allow a direct mapping to external data structures. With these features, the disclosed methods are able to combine the flexibility and unstructured nature of traditional spreadsheet with the structuring capabilities of online analytic processing (OLAP)-based tools.

32 Claims, 9 Drawing Sheets

ABSTRACT VIEW     DATA VIEW     FLAT VIEW (A)     (B)     (C)

| | 2001 | | | | | 2002 | | | | |
|---|---|---|---|---|---|---|---|---|---|---|
| | Q1 | Q2 | Q3 | Q4 | | Q1 | Q2 | Q3 | Q4 | |
| East | 1 | 2 | 3 | 4 | 10 | 2 | 4 | 6 | 8 | 20 |
| West | 5 | 6 | 7 | 8 | 26 | 10 | 12 | 14 | 16 | 52 |
| South | 9 | 10 | 11 | 12 | 42 | 18 | 20 | 22 | 24 | 84 |
| | 15 | 18 | 21 | 24 | 78 | 30 | 36 | 42 | 48 | 156 |

STRUCTURING AND EDITING A RECURSIVELY MULTI-DIMENSIONAL SPREADSHEET

TECHNICAL FIELD

This disclosure generally relates to human-computer interaction, and, more particularly, to methods for structuring cells in structured electronic documents (e.g., spreadsheets) by splitting individual cells to facilitate the creation of multi-dimensional documents and the manipulation of data stored therein.

DESCRIPTION OF RELATED ART

The approaches described in this section could be pursued but are not necessarily approaches that have been previously conceived or pursued. Therefore, unless otherwise indicated, it should not be assumed that any of the approaches described in this section qualify as prior art merely by virtue of their inclusion in this section.

A spreadsheet is a computer application that helps to enhance the user's productivity in capturing, analyzing, and sharing tabular data sets. The visual representation of most spreadsheet applications is similar, and it involves a two-dimensional matrix or grid of cells. The two-dimensional grid has columns and rows, whereas columns are typically labeled with letters A, B, ..., Z, AA, ..., while rows are labeled with numbers 1,2, ... Accordingly, each cell can be addressed by row and column index: A1, A2, ..., B1, B2, ..., and rectangular cell areas can be addressed by their corner coordinates, such as B2:C4. A cell can contain a number, a text, or a formula. A formula can involve constants, arithmetic operators, functions, references to other cells, or any combination thereof. Furthermore, spreadsheet applications enable efficient automatic recalculation; whenever the contents of a cell have been edited, all cells that are directly or transitively dependent on that cell are recalculated.

Classical two-dimensional spreadsheets are very good at handling unstructured data and enabling the interactive and incremental configuration of its structure. However, classical spreadsheets are deceptively poor at handling any kind of structured data; they lack flexibility of structuring, and their interaction with external applications can be difficult.

The problems with spreadsheets have been extensively documented in the literature. Traditional spreadsheets have significant reliability problems, and they are difficult to debug and audit. Implementing a complex model on a cell-by-cell basis requires tedious attention to detail. The practical expressiveness of spreadsheets can be limited unless their modern features are used. Some intuitively simple operations, such as the alteration of a dimension, demand major redesign efforts and are so difficult that one generally has to start over. Interaction with external tools, such as databases or software applications written in modern programming languages, is often limited to basic data import and visualization.

Many attempts have been made to address some of the above problems. For example, Improv, a product of Lotus Software (also known as Lotus Development Corp.) launched in 1991, introduced what has come to be known as the pivot table based on the online analytical processing (OLAP) cube analogy, but was largely rejected because it lacked some basic spreadsheet functions. It has been followed by numerous products such as business analytics and data mining tools that provide powerful data structuring capabilities, but have totally lost the intuitive and unstructured aspects that made the spreadsheet successful in the first place. Indeed, using such tools requires the same degree of advanced planning and attention as writing a program source code, and this is why they are typically targeted at professional users only.

Accordingly, there is still a need for a solution to these structuring problems and the limitations of current spreadsheets.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In accordance with various embodiments and the corresponding disclosure thereof, methods and systems for structuring spreadsheets or other electronic documents having an ordered set of cells are provided. This disclosure overcomes the shortcomings existing in the prior art by revisiting the very structure of what constitutes a spreadsheet, which has not changed much since its origin thirty years ago.

In general, this disclosure provides for multidimensionality by allowing cells to be split by splitting operators, thus allowing cells to contain additional groups of cells, and recursively so. This approach provides useful tools and operations for building and modifying various multidimensional structures and for interacting with them. The splitters, in turn, provide a two-dimensional equivalent of lexical scopes and iterators in programming languages and allow a direct mapping to external data structures. With these features, the present methods and systems are able to combine the flexibility and unstructured nature of a traditional spreadsheet with the structuring capabilities of OLAP-based tools.

In one aspect, there is provided a computer-implemented method of structuring an electronic document having an ordered set of cells. The method may comprise receiving a request to split at least one target cell of the electronic document, the request comprising an identification of the at least one target cell and splitting parameters. The method may further comprise creating one or more new cells embedded into the at least one target cell, in accordance with the splitting parameters.

According to an embodiment, the splitting parameters may comprise one or more of a number of new cells to be embedded into the at least one target cell, a number of columns of new cells, and a number of rows of new cells. The electronic document may comprise a multidimensional electronic document having cells configured to recursively contain sets of cells. The at least one target cell and the one or more new cells can be editable cells and can be configured to be populated with one or more formulas or objects. The one or more objects may comprise one or more of the following: a text, an image, a video, a widget, and a number. The one or more objects can be computed with a formula associated with the at least one target cell. The method may further comprise generating implicit formulas, values or indices for every new cell. The one or more of new cells can be ordered in a multi-dimensional grid nested into the at least one target cell. The request to split the at least one target cell of the electronic document may comprise at least one splitting operator. The at least one splitting operator may comprise one or more of a vertical splitter and a horizontal splitter, each splitter being either structured or unstructured. A structured splitter can be configured to be transformed into an unstructured splitter, and vice versa. Two or more splitting operators can apply to the same grid as long as they do not conflict, and/or be recursively embedded into each other. A splitting operator may define a lexical scope over the cells it covers, binding values to variable names. The method may further comprise generating a processor-implemented program having data structures corresponding to the at least one splitting operator and having code corresponding to the at least one formula associated with the electronic document. The at least one splitting operator can correspond to a processor-implemented program code. The electronic document can be structured automatically based on input source code so that the at least one splitting operator corresponds to data structures and formulas associated with the input source code. The method may further comprise generating at least one database schema corresponding to the at least one splitting operator associated with the electronic document, and generating at least one database query corresponding to at least one formula associated with the electronic document. The electronic document can be structured automatically based on at least one input database schema and one or more database queries, such that the at least one splitting operator corresponds to the at least one database schema and formulas correspond to the one or more database queries. The method may further comprise generating one or more web pages whose structure corresponds to the at least one splitting operators associated with the electronic document. The method may further comprise enabling application of a formula to one or more new cells embedded into the at least one target cell. A formula may refer to variables names introduced by splitters visible in its lexical scope. The formula may comprise one or more comprehension expressions. The method may further comprise enabling population of one or more new cells embedded into the at least one target cell with at least one object. The electronic document may have an ordered set of cells comprising one or more of a spreadsheet, hypersheet, and a web page.

According to another aspect, there is provided a system for structuring an electronic document having an ordered set of cells. The system comprises a communication module configured to receive a request to split at least one target cell of the electronic document, the request comprising an identification of the at least one target cell and splitting parameters. The system further comprises a splitting module configured to create one or more new cells embedded into the at least one target cell, in accordance with the splitting parameters.

According to various embodiments, the splitting module can be configured to generate indices for every new cell, with the indices associated with indices of the at least one target cell. The system may further comprise a populating module configured to enable application of a formula to one or more new cells embedded into the at least one target cell. The populating module can be further configured to enable population of one or more new cells embedded into the at least one target cell with at least one object. The one or more of new cells can be ordered in a multi-dimensional grid nested into the at least one target cell. The request to split the at least one target cell of the electronic document may comprise a splitting operator. The splitting operator may comprise one or more of a vertical splitter, a horizontal splitter, each splitter being either structured or unstructured.

According to yet another aspect there is provided a processor-readable medium having instructions stored thereon. The instructions, when executed by one or more processors, may cause the one or more processors to: receive a request to split at least one target cell of the electronic document, the request comprising an identification of the at least one target cell and splitting parameters, and create one or more new cells embedded into the at least one target cell, in accordance with the splitting parameters.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

Embodiments are illustrated by way of example and not limitation in the figures of the accompanying drawings, in which like references indicate similar elements and in which.

DETAILED DESCRIPTION

Figure 1:
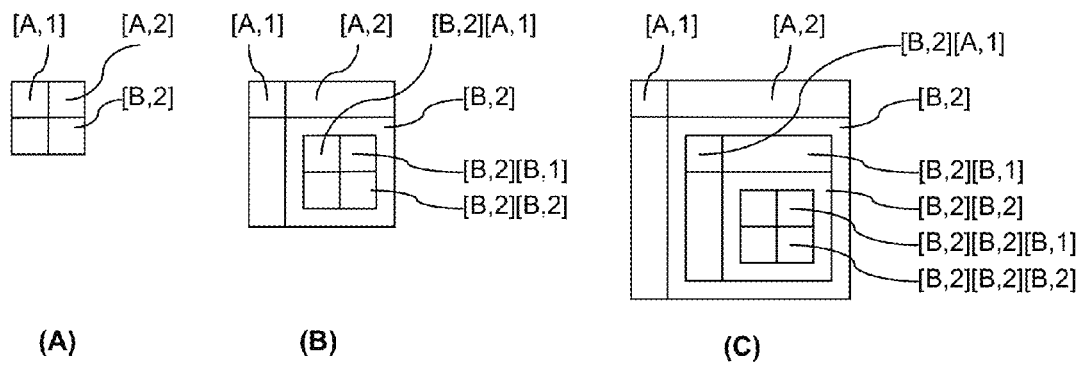
FIG. 1 shows a simplified technique for splitting cells in a hypersheet, according to an example embodiment.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is, therefore, not to be taken in a limiting sense, and the scope is defined by the appended claims and their equivalents. In this document, the terms "a" and "an" are used, as is common in patent documents, to include one or more than one. In this document, the term "or" is used to refer to a nonexclusive "or," such that "A or B" includes "A but not B," "B but not A," and "A and B," unless otherwise indicated.

The techniques of the embodiments disclosed herein might be implemented using a variety of technologies. For example, the methods described herein may be implemented in software executing on a computer system, or implemented in hardware utilizing a combination of microprocessors or other specially designed application-specific integrated circuits (ASICs), programmable logic devices, or various combinations thereof. In particular, the methods described herein may be implemented by a series of computer-executable instructions residing on a storage medium such as a carrier wave, disk drive, or computer-readable medium. Exemplary forms of carrier waves may take the form of electrical, electromagnetic, or optical signals conveying digital data streams along a local network or a publicly accessible network such as the Internet.

Overview

The disclosure provides methods and systems for structuring electronic documents containing an ordered set of cells, such as spreadsheets. According to these methods, one and the same document may combine both unstructured parts, like a classical spreadsheet, and structured parts where appropriate, like an OLAP-based tool. For this purpose, each cell may be split into one or more new cells that are recursively embedded into their parent cell. Such new cells can be structured and organized as a two-dimensional grid or matrix. Each new cell, in turn, can also be split and new additional structured cells can be created within a previous cell. New cells as well as original cells may store a text, number, reference, image, video, graphical widget, or formula. Once a new cell is created, it may automatically be assigned with corresponding indices associated with a parent cell, or be given a name. Accordingly, new cells can be referenced and various formulas can be applied. Hence, by allowing cells to contain not only a single element such as a text, number, formula, or arbitrary graphical widget, but also collections of other cells, such as sequences, sets, or two-dimensional grids, a classical two-dimensional spreadsheet can be reconfigured into a multi-dimensional and recursive document. As used herein, the term "hypersheet" refers to a multi-dimensional and recursive electronic document defined by splitting cells.

Referring now to the drawings, FIG. 1 shows a simplified technique for splitting cells in a hypersheet, according to an example embodiment. This figure, in particular, shows the principles of multi-dimensionality and recursivity that a classical spreadsheet may obtain once the methods described in the current disclosure are applied.

More specifically, FIG. 1A shows a classical spreadsheet represented as a two-dimensional 2×2 grid having four cells. Each cell is independent, and, in general, may contain any allowable object such as a text, number, reference, or formula. Assuming the standard spreadsheet numbering scheme, the cells can be referred to as [A,1], [A,2], [B,1], and [B,2].

FIG. 1B demonstrates the creation of a multi-dimensional hypersheet by splitting the cell [B,2]. Specifically, the cell [B,2] is split into four new cells which are organized in a two-dimensional 2×2 grid. These new cells can recursively be referred to as {[B,2][A,1]}, {[B,2][A,2]}, {[B,2][B,1]}, and {[B,2][B,2]}. Each new cell is independent and, similar to a parent cell, may contain an object or formula.

Similarly, any of the new cells can be split. For example, as shown in FIG. 1C, the cell {[B,2][B,2]} is split to create a new two-dimensional 2×2 grid, which is embedded into the parent cell {[B,2][B,2]}. New cells are also provided with corresponding indices associated with parent cells. In the example shown, the new cells are numbered as {[B,2][B,2] [A,1]}, {[B,2][B,2] [A,2]}, {[B,2][B,2] [B,1]}, and {[B,2][B,2] [B,2]}.

Accordingly, the examples shown in FIG. 1 demonstrate the recursivity of hypersheets as any cell of a grid may contain a new grid in the same structure as the parent one. However, it should be understood that cells can be split to create any other structure, and there is no necessity to replicate the structure of the parent grid. For example, a cell of a 2×2 grid can be split to embed a new 3×3 grid, rather than a 2×2 grid like the parent grid. It should be also noted that not only a single cell can be subjected to splitting, but also multiple cells. For example, two cells can be split into three or more cells.

Splitters

The recursive multi-dimensional splitting of cells is achieved through the use of splitters, namely operators that when applied to a range of cells split this range horizontally or vertically. A splitter specifies the number of lines or columns into which the range is split. This value can be static or computed dynamically, and may change over time.

Figure 2:
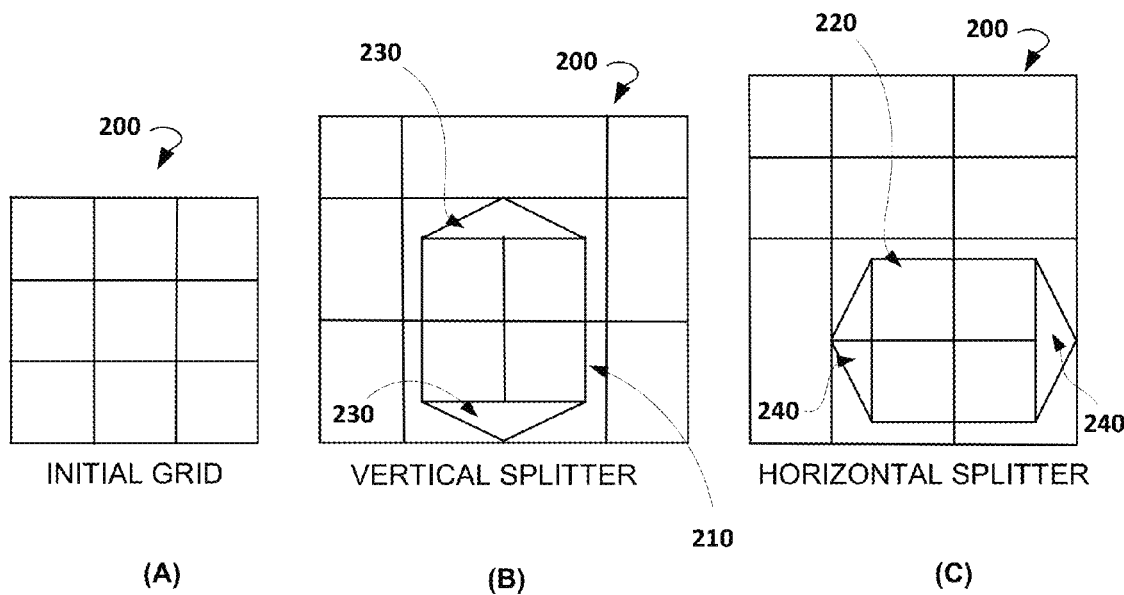
FIG. 2 shows examples of applying vertical and horizontal splitters.

Graphically, splitters can be visually represented by highlighting the range they split. FIG. 2 shows examples of applying vertical and horizontal splitters. In particular, FIG. 2A shows an initial two-dimensional 3×3 grid 200 to which various splitters are applied. FIG. 2B demonstrates a vertical splitter 210, which is applied to the grid 200. The shown vertical splitter 210 is used to split two adjacent cells of a single column into four cells of two columns. FIG. 2C demonstrates a horizontal splitter 220, which is applied to the grid 200. Similarly, the horizontal splitter 220 is used to split two adjacent cells of a single row into four cells of two rows.

The visual representation of splitters forms the basis for graphical interaction, where a user can define and modify splitters by dragging them over a grid using a pointing device such as a computer mouse. FIG. 2 shows an example of visual representation where splitters comprise at each end handles 230 and 240 that can be used for interactive dragging and positioning of splitters.

Figure 3:
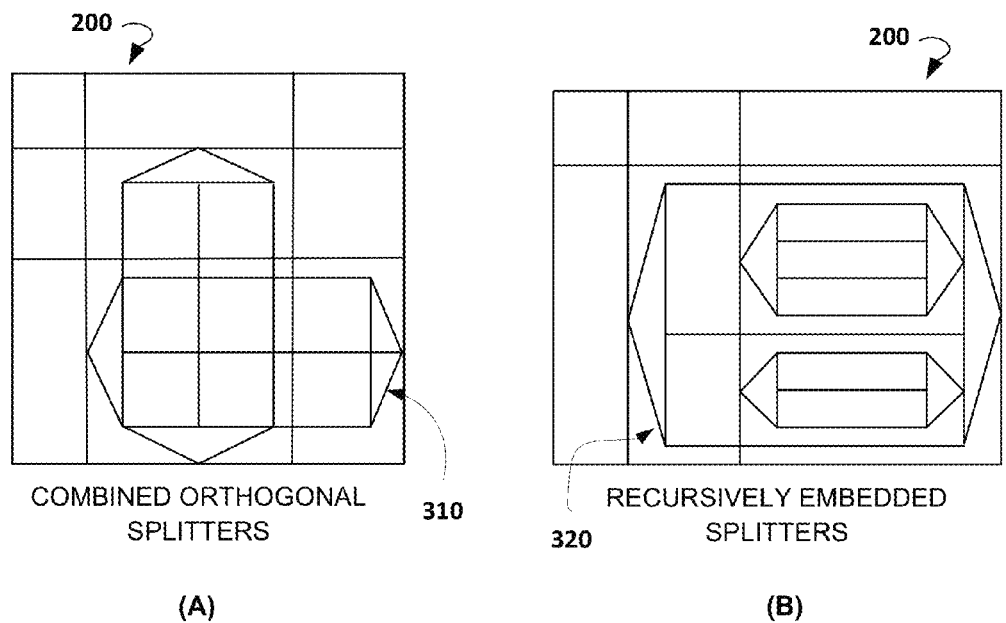
FIG. 3 shows a simplified graphical representation of combined splitters examples.

In some embodiments, splitters can be combined, as shown in FIG. 3. Specifically, FIG. 3A shows a combination of vertical and horizontal splitters 310 for the bi-directional splitting of cells in the hypersheet 200. FIG. 3B shows recursively embedded splitters 320, which enables cells to be split in a recursive manner such that split cells can again be split.

Since splitters have a graphical representation, it is possible for a user to define them interactively via a graphical user interface.

Abstract and Data Views of Splitters

There are two radically different ways of looking at splitters, depending on whether they are considered as defining abstract structures (like data structure definitions in a program source code) or as structures filled with actual data (like traditional spreadsheets). For instance, the abstract representation of a list of numbers requires only one "abstract" cell, while its actual representation requires as many "concrete" or "data" cells as there are data elements. Abstract cells typically relate to formulas, data types and other meta-information about the data, while concrete cells contain the actual data itself.

Figure 4:
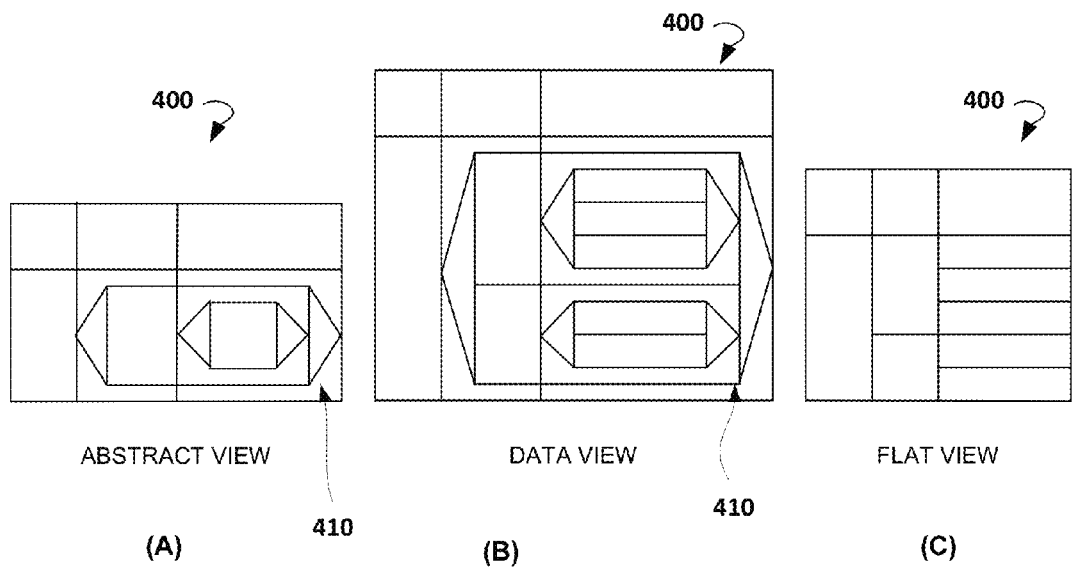
FIG. 4 shows various simplified graphical representations of one and the same splitter applied to a hypersheet, according to an example embodiment.

FIG. 4 shows different visual representations of a splitter 410 applied to a hypersheet 400, according to an example embodiment. In particular, FIG. 4A is an abstract view of the hypersheet 400 and the splitter 410 applied thereto. This view shows only the abstract structure of cells as defined by the splitters, without any actual data. This is typically what a software developer will see. FIG. 4B is a defined view that shows the same structure in relation to actual data, where the splitters split cells into as many lines as there are data elements. This is typically what a hypersheet designer will see. When all structuring information has been removed from a data view, the result is a flat view as shown in FIG. 4C. This is typically what the end user will see.

Since the visual options giving rise to the three views (abstract, data and flat) are local to each cell and each splitter, any combination of the three views can be displayed. For instance, one splitter may be displayed according to the abstract view, while another may be displayed according to the flat view. This feature is useful, for instance, in order to focus on an area of the hypersheet by displaying its entire structure, while hiding irrelevant details by using the flat view for the remaining areas.

This distinction between abstract and concrete (or data) views of cells is reminiscent of the clear distinction typically made by programming languages between the definition of a data structure and a given instance of this data structure. For instance, the definition of an array of integers can be written in the Java language as int[ ], while a specific instance (a value) is written as {1, 2, 3}. The two notations may be combined in an initialization statement that sets the initial value of the array to some given in-line data:

int[ ] a={1, 2, 3}

Alternatively, the initial value of the array may be the result of a computation:

int[ ] a=computeRange(1,3)

The first idiom is akin to spreadsheet cells containing values, while the second corresponds to a spreadsheet formula. Typically, a hypersheet may use the abstract view to display formulas and the data view to display input data or results of computation.

Splitters Introduce Lexical Scope

Splitters may introduce variables that can be referred to by name in formulas. The variables introduced by a splitter are visible throughout the lexical scope of the splitter, namely the whole range of cells that it contains.

Figure 5:
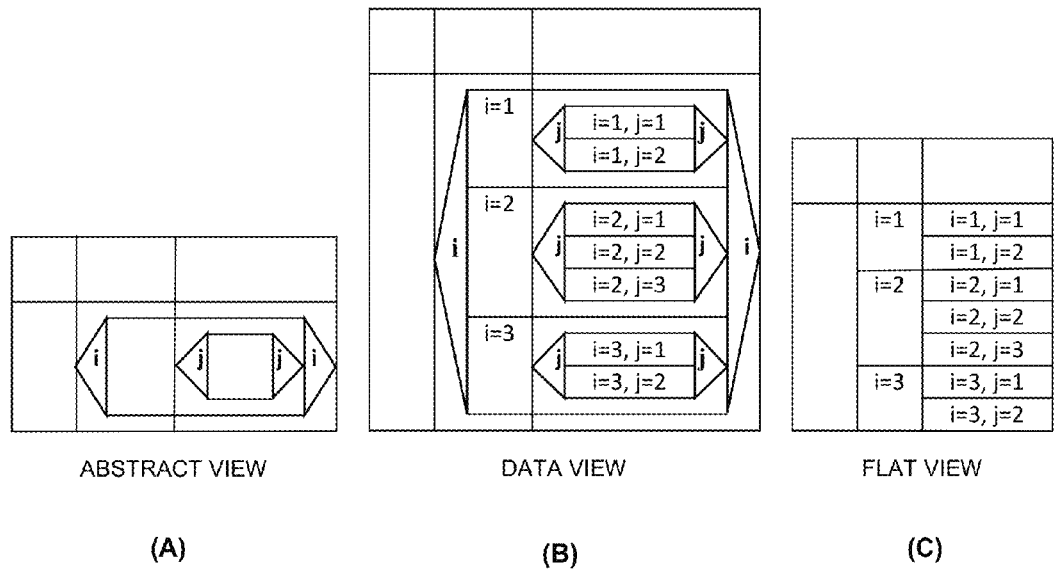
FIG. 5 shows an example of a lexical scope in various views of a hypersheet for an embedded splitter.
Figure 6:
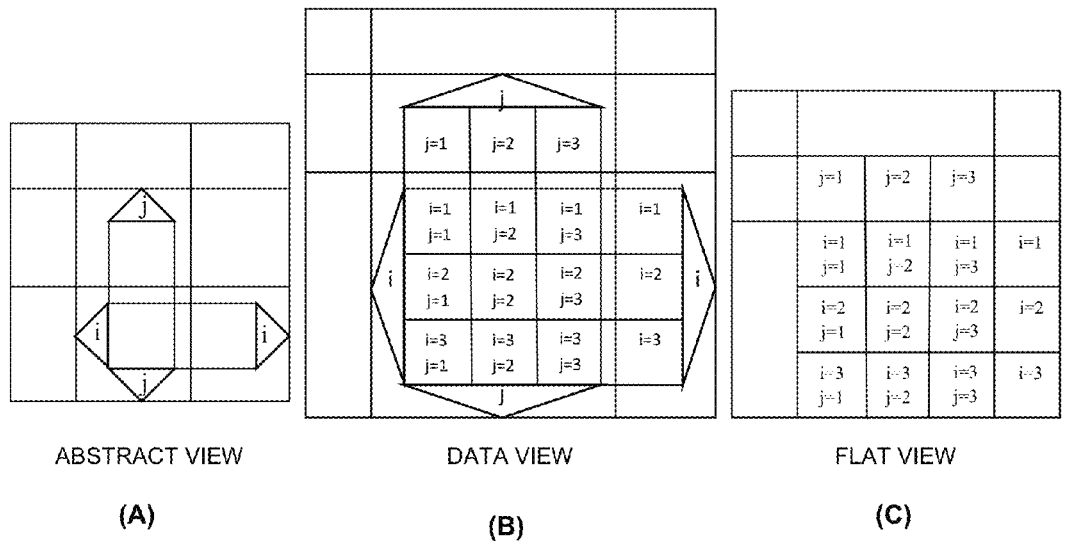
FIG. 6 shows a lexical scope in various views of a hypersheet for a combined splitter.
Figure 7:
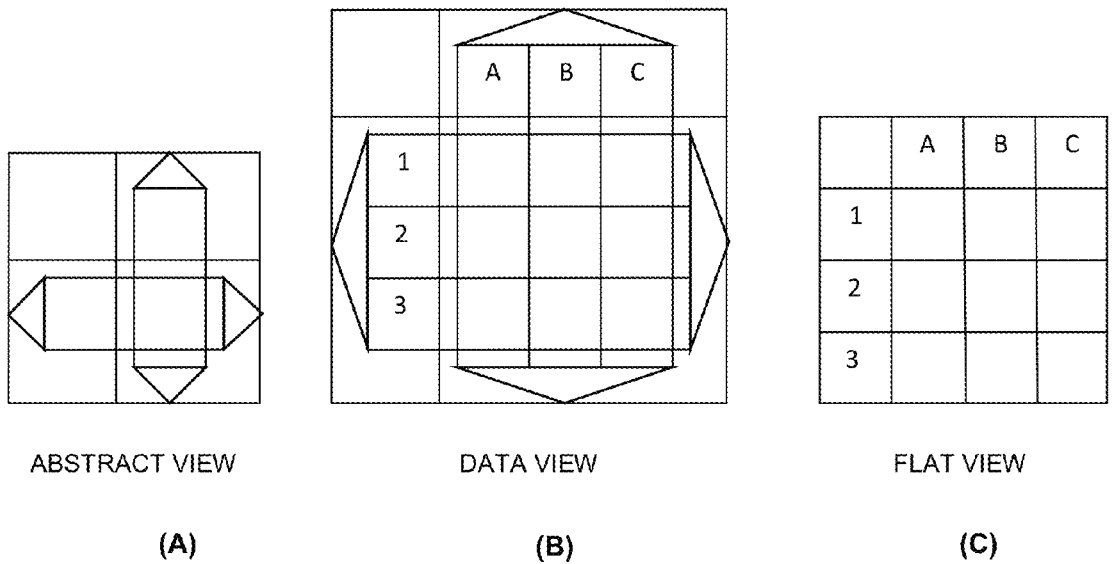
FIG. 7 shows a two-dimensional grid of a classic spreadsheet defined by independent splitters.

The graphical representation of splitters, as shown in FIGS. 5, 6 and 7, provides an ability to visualize the extent of their lexical scope. It may also optionally show the variable name, the iterator values, and the way the grid is split.

Multiply embedded splitters can introduce several lexical contexts and bound variables, just like embedded looping constructs and generators do in the source code of a programming language. An example of lexical scope in various views of a hypersheet for embedded splitters is shown in FIG. 5. In particular, FIG. 5A illustrates an abstract view, FIG. 5B illustrates a data view, and FIG. 5C illustrates a flat view of a hypersheet with multiple applied splitters.

An inner splitter variable may hide an outer splitter variable with the same name, just like inner variable declarations hide outer variable declarations in the source code of programming languages.

It should be noted that the iterating range of an inner splitter (such as variable "j" in FIG. 5) may depend on a value such as the iteration value of an outer splitter (such as variable "i" in FIG. 5).

A major difference with programming language constructs is that splitters applied to multi-dimensional grids of cells can appear along several dimensions. The set of bound variables in a given cell is the union of bound variables provided by vertical and horizontal splitters ranging over the cell. FIG. 6 shows a lexical scope in various views of a hypersheet for a combination of splitters. More specifically, FIG. 6A illustrates an abstract view, FIG. 6B illustrates a data view, and FIG. 6C illustrates a flat view of a hypersheet with multiple applied splitters.

The case of the same variable being bound vertically and horizontally is handled by specific combination rules (for instance, by raising an error flag). The same notion of splitters for two-dimensional grids extends naturally to any number of dimensions. Additional dimensions are difficult to visualize directly and typically require some form of projection over a 2D support. Examples of projections include dependence on a value defined elsewhere in the sheet or navigating back and forth in an additional dimension using keyboard keys or a mouse.

An alternative option for simulating additional dimensions is to insert "hiding" splitters that display only one of their iterations, depending on the value of another cell in the sheet.

It should also be noted that there is no need to distinguish between "index" cells (i.e., the ones that display row and column numbers in traditional spreadsheets) and "contents" cells. Index cells can be just normal cells that happen to display the current value of an iterator.

The classical two-dimensional array structure offered by traditional spreadsheets is a particular case of the multidimensional recursive structure presented herein. It consists in a top-level cell with:

1) One horizontal splitter covering the whole top-level cell, whose anonymous variable ranges over 1, 2, 3, and so forth;
2) One vertical splitter covering the whole top-level cell, whose anonymous variable ranges over A, B, C, and so forth; and
3) Default formulas in the first row and first column for displaying index values.

FIG. 7 shows a two-dimensional grid of a classic spreadsheet defined using two independent splitters. In particular, FIG. 7A illustrates an abstract view, FIG. 7B illustrates a data view, and FIG. 7C illustrates a flat view of a hypersheet with a combination of splitters.

According to an example embodiment, the grid-like visualization of embedded cells presented in this section is the default one, but not the only one possible. A grid structure defined by splitters may alternatively be displayed using any kind of graphic widget, whose actual displayed graphics may depend on the values of the variables in scope in that cell.

For instance, the cell [2] [3] in FIG. 6, which has variables "i" and "j" in scope, is represented as a 3×3 grid, where each inner cell displays the corresponding values of i and j. Alternatively, the values may be displayed, for instance, as points or lines on a graph with two axes, as histograms, or as semantic information overlapped on a map. Arbitrary graphic widgets may also be used for data input, such as pull-down menus.

Figure 8:
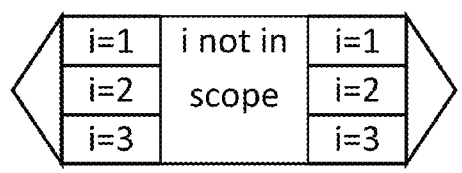
FIG. 8 shows an example graphical representation of a grouping construct.

Grouping constructs inside a splitter hide the effects of the splitter over a given range. The variable name and iteration value become invisible. Grouping constructs are especially useful when computing subtotals or other kinds of reductions. FIG. 8 shows an example graphical representation of a grouping construct.

Splitters as Scoped Iterators

Structured splitters provide the visual and multi-dimensional equivalent of iteration generators in programming languages. They can introduce a lexical scope, a variable name, and an iterator. They split a cell into as many sub-cells as there are iteration values.

Many programming languages provide a notion of iteration generator. An example in the Java programming language is as follows:

```
Iterable I = new Range(1, 3);
for(int i : I) {
    // do something with i
}
```

In this example, the loop construct "for" introduces a new lexical scope delimited by the symbols "{" and "}". The fragment "int i: I" is called the generator. The generator operates to:

Introduce a local variable "i" visible in the lexical scope of the loop; and

Specify the values to be taken by "i" at each iteration (in this example, the values are 1, 2 and 3). This is called the iteration domain, and its size is the branching factor (the number of sub-cells) of the splitter.

A similar notion is used for data structures. The typical example is a map from keys to values: the keys form the iteration domain, and the values correspond to iterations. Degenerate cases include arrays, sequences, lists and vectors (which map from implicit indices to values), and multi-sets (which map from values to their multiplicity).

As a concrete example, the OptimJ language (Object-Oriented Modeling with Optimj. 2008-02-27, http://www.ateji.com/download/Object-Oriented%20Modeling%20with%20OptimJ.pdf; incorporated by reference) introduces "generalized initializers" that can for instance introduce a lexical scope for the keys of a map:

String[ ] array[int i: 1 . . . 10]=2·i

Namely, in this data initializer, a local variable "i" is defined and bound to the values in range 1 . . . 10. A new lexical scope is defined where "i" is visible, and it ranges over the initialization expression at the right of the equal sign. This example illustrates that local iteration variables associated to a lexical context are not only a feature of looping statements but can also appear in data definitions. The iterator itself may depend on the values of other cells. For instance, the iteration count may change according to the iteration expression. When a variable name is not needed, a splitter can be "anonymous" and only specify a number of iterations. A degenerate case of iteration generators is the introduction of a local variable, which can be seen as a generator having exactly one iteration.

Structured and Unstructured Splitters

The notion of tuple or object iterator is somewhat similar to that of iteration generators, in that it splits a given data into several fields, but it differs in the sense that tuple fields are conceptually unrelated to each other. As an example, all elements of an array have the same type, the same units, the same display methods, and the like. In contrast, tuple fields may have different data types and be displayed in very different ways. Using again the OptimJ notation, an example of a tuple with two fields, an integer and a character string, is:

(:int, String:) tuple=(:123, "abc":)

Some dynamically typed programming languages, such as JavaScript, offer constructs to iterate over tuples or object fields.

Splitters come in two kinds that reflect this duality between structured iteration over a collection of related data elements, and unstructured iteration over a set of unrelated tuples or object fields. These two kinds of splitters are referred to as "structured" and "unstructured" splitters:

1) Structured splitters correspond to iteration over the elements of a structured collection. They introduce sub-cells typically sharing the same structure, the same data type and the same formula. In the abstract view, structured splitters split cells into exactly one inner cell. This inner cell in the abstract view may correspond to an arbitrary large number of inner cells in the data view, one for each iteration value, namely for each element in the collection.

Structured splitters are useful for defining collections of data, such as lists, sets, and the like. As an example, structured splitters provide a method for defining the dimensions of an OLAP cube.

2) Unstructured splitters correspond to iteration over tuple fields. They introduce inner cells that have no relation to each other and may contain different data types and different formulas. In the abstract view, unstructured splitters split cells into as many inner cells as there are fields in the tuple. Each of these inner cells corresponds to exactly one inner cell in the data view.

Mapping directly unstructured splitters to programming language constructs require a dynamically typed language, since fields of a tuple may have different types. An alternative is to consider that unstructured introduce not one but several independent lexical scopes. The iteration variable is defined and bound separately for each iteration, inside each lexical scope.

Unstructured splitters are also useful for simply laying side-by-side unrelated data. A two-dimensional grid split with unstructured splitters is analogous to a traditional spreadsheet, in that neighboring cells may contain different kinds of input data or formulas, with no relationship to each other.

Figure 9:
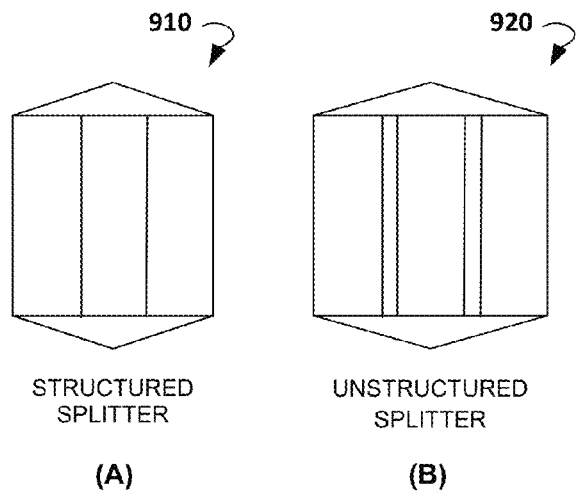
FIG. 9 shows a simplified graphical representation of structured and unstructured splitters.

FIG. 9 shows example graphical representations of structured and unstructured splitters. In particular, FIG. 9A illustrates a structured splitter 910, while FIG. 9B shows a structured splitter 920. Visually, structured and unstructured splitters are distinguished by making the inner cells contiguous for the former and separated by a margin for the latter.

The ability to change the kind of a given splitter from structured to unstructured, or vice versa, is an essential feature of the present disclosure that makes it possible to combine the flexible, unstructured nature of traditional spreadsheets with the rigid, structured nature of OLAP-based tools.

Splitters Defining Data Structures

The application of splitters to a structured document with recursive and multi-dimensional sets of cells enables a top-down construction of the data structures commonly found in programming languages. One-dimensional arrays are defined by the application of a single horizontal or vertical splitter. On the other hand, multi-dimensional arrays are defined by the combined application of a horizontal and a vertical splitter. Other kinds of collections such as sequences, sets, multi-sets, maps, are built upon arrays by factoring-in additional algebraic properties. This is analogous to the way standard collection libraries for programming languages are built upon basic arrays.

Structures or objects are defined by unstructured splitters having one iteration value for each field of the structure. Recursive data structures are defined by recursively embedding splitters. Consequently, a relational database can be modeled as a hypersheet by defining a set of two-dimensional arrays, one for each table in the database, where the vertical splitter defines table columns and the horizontal splitter defines table rows.

Similarly, the layout structure of a web page, or any other textual document based on a visual box model, can be modeled as a hypersheet by using vertical splitters for paragraphs, and a combination of vertical and horizontal splitters for tables.

Formula Language

Generally, formulas in traditional spreadsheets are functional expressions that may possibly refer to the value of other cells. The formulas can be similarly used in hypersheets, but with a major difference. Since an arbitrarily complex data structure can be represented by recursively embedded collections of cells, operations on structured data can be expressed using one single formula for one whole data structure, rather than one formula for each single cell as is required in traditional spreadsheets.

Figure 10:
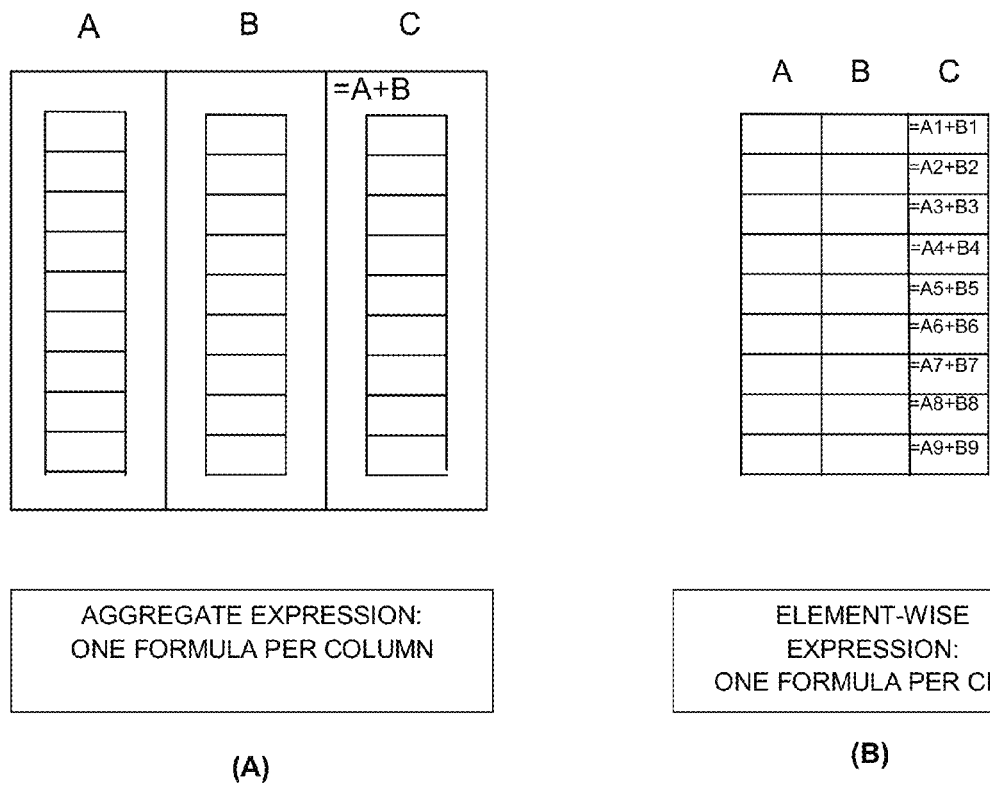
FIG. 10 shows an application of formulas in a two-dimensional spreadsheet and a multi-dimensional spreadsheet.

As an example, consider computing the sum of two columns of numbers into a third column. Traditional spreadsheets require one formula per cell of the third column. In hypersheets, we can view one data column as the contents of a single abstract cell and use one single formula independently of the amount of data. With reference to the drawings, FIG. 10 shows an application of formulas in a two-dimensional spreadsheet. In particular, FIG. 10A shows the abstract view of cells, with two abstract cells named "A" and "B" containing input data and a cell "C" containing a single formula "A+B". In contrast, FIG. 10B shows an element-wise definition where each cell is assigned with an individual formula, as is common with traditional spreadsheets.

Thus, a hypersheet typically contains zero or one formula per abstract cell. A formula may also be used to indicate that the value of a given cell is an input value to be provided interactively by the user or read from an external data source, and possibly subject to validation by a predicate. For the ease of explanation, we will assume that the special formula "input" indicates an input cell, and that formulas computing values start with an "=" sign.

Formulas may even define not only the data values but also the internal structure of complex cells, such as the sizes of sub-grids. For instance, a formula resulting in a set of values defines as many sub-cells as there are elements in the set. Formulas can refer to the variables in scope for the current cell, introduced by enclosing splitters. This is similar to expressions in programming languages that can reference all variables in lexical scope at the expression site.

Formulas can be expressed in any mostly functional syntax (for instance, a syntax inspired by a functional programming language such as Caml). The term "functional" means a declarative style of specification where the result value is defined as a function, in the mathematical sense, of the values it depends upon. This is in contrast to imperative programming, where result values are obtained after successive modifications of memory locations. The term "mostly functional" means that state-changing operations are not entirely forbidden, just like in Caml, since they may make operations such as input-output simpler or more concise.

The present disclosure has an important feature related to removing the need for a separate macro language, since the formula language is expressive enough. This feature is further discussed in the following sections.

Comprehension Expressions

The formula language in hypersheets typically features comprehension expressions, namely bulk data processing operations that make it easy to handle large structured data collections, as well as to define reduction operations. The OptimJ extension for the Java language is an example of a successful integration of comprehensions within a general purpose programming language.

An example of a collection valued comprehension is the set of squares of numbers taken in a given list, written using OptimJ syntax as:

{x*x|x in list}//the set of all x*x, for all x in list

An example of an element valued comprehension is the sum of numbers taken in a given list, written as:

Σ(x*x)_x in list//the sum of all x*x, for all x in list

It should be understood that various comprehension expressions can be successfully used. In "Towards an effective calculus for object query languages" by Fegaras L. & Maier D.; Proceedings of the 1995 ACM SIGMOD international conference on Management of data (pp. 47-58); San Jose; Calif.; US (the reference is incorporated herein by reference) there are disclosed numerous examples that show how comprehension expressions can express all SQL database queries, and much more. Together with the recursive multidimensional structure of multi-dimensional hypersheets, comprehension expressions are a tool of major importance towards removing the need for a companion macro language and to easily integrate database connections and database operations.

Reactive Programming

The formula languages of traditional spreadsheet software are mostly functional, while their companion macro language (for instance, Visual Basic in the case of Excel) is imperative. This impedance mismatch between the formula language and the macro language is one of the factors that make traditional spreadsheets difficult to manage.

Variables in formulas are mostly reactive variables, in the sense of reactive programming (e.g., as defined in "Reactive C" programming language), meaning that values are recomputed automatically whenever a dependency has changed. There is a close duality between multi-dimensional hypersheets and functional reactive programs (FRP). The formulas in a multi-dimensional hypersheet, in the form "cell=formula" where cell is a cell reference and formula is the formula found in that cell, gives an FRP that is equivalent in the sense that all variables eventually get assigned the same values.

In Caspi et al., "LUSTRE: a declarative language for real-time programming", in POPL'87, Proceedings of the 14$^{th}$ ACM symposium on Principles of Programming Languages, 1987 (the reference is incorporated herein by a reference), there are provided surveys of well-known compilation and translation techniques for FRPs. Reciprocally, associating a cell of the same name to each variable definition of an FRP gives an equivalent multi-dimensional hypersheet.

Implicits

Implicits are notation shortcuts that can drastically simplify the definition of a hypersheet. There are several kinds of implicits:

1) Implicit formulas may display the values of the closest splitters. They are useful for displaying index rows and columns.

2) In formulas, implicit range and quantification make it possible to drop important parts of comprehension expressions. They rely on the set of shared splitters between the current cell and the cell referenced by a comprehension.

Comprehensions implicitly quantify over shared splitters and iterate over unshared splitters. In the example shown in FIG. 11 and discussed in more detail below, this is what makes it possible to write Σ input as a short-hand for [Quarter] Σ(input [Region, Year, Quarter])_(Region).

3) In grouping constructs, a similar implicit range and quantification makes it possible to provide a single reduction operator, such as Σ, in place of a whole formula.

Operations on single elements can be implicitly extended to operations on collections of elements. In the example of FIG. 10A, the formula "=A+B" is a shorthand for "=[i] A[i]+B[i]". Namely, each cell of C is the sum of the corresponding cells in A and B.

EXAMPLE

The sales figures example presents sales data grouped by year, quarter, and region, plus subtotals across various dimensions. Its abstract model is shown in FIG. 11 and its flat view is shown using sample data in FIG. 12.

In the example shown, the whole abstract model contains six splitters and seven formulas, regardless of the size of the actual input data. Those skilled in the art would readily understand that the same example modeled in a classical spreadsheet would require many more, and more complex, formulas.

Figures 11, 12:
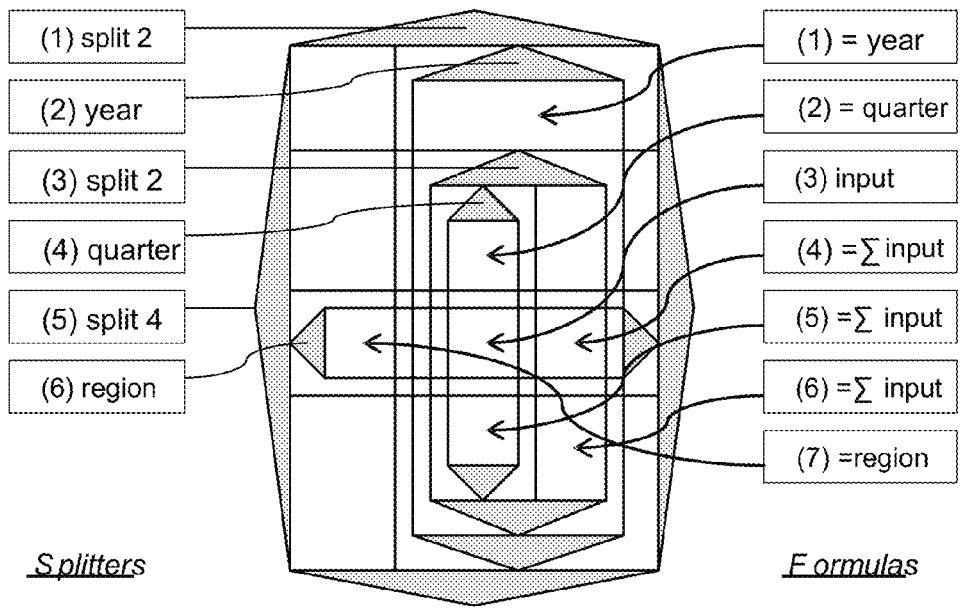
FIG. 11 shows an abstract view of a particular example for combined splitters.
FIG. 12 shows a flat view of the example of the combined splitter shown in FIG. 11 populated with sample data.

In the example shown in FIGS. 11 and 12, three of the splitters are structured splitters (iterators):

(2) years, with sample values 2001, 2002
(4) quarters, with sample values Q1, Q2, Q3, Q4
(6) regions, with sample values East, West, South The remaining splitters (1), (3) and (5) are unstructured and anonymous; their purpose is only to divide the grid, without introducing any variable.

Formulas (1) and (2) display the current values of the 'years' and 'quarters' variables. Formula (3) states that the zone is for data input, and this is where the sales figures are stored. Formulas (4), (5) and (6) compute subtotals across various dimensions. Formula (7) displays the current value of the 'regions' variables. Note how the seven formulas in the abstract view shown in FIG. 11 correspond to the seven different kinds of areas in the flat view shown in FIG. 12.

These formulas assume, for simplicity, that the input area is referred to by name and they rely heavily on implicits. For instance, formula (4) sums the sales figures for a given year and region over all quarters, since year and region are in scope in both the summation range and the formula cell, while quarter is not.

It should be noted that managing changes is much easier than in classical spreadsheets. For instance, exchanging the time and region dimensions (namely displaying years and quarters vertically and regions horizontally, rather than the opposite) is a small change in the abstract view of this hypersheet, while the same change would require a major restructuring of an equivalent classical spreadsheet. As another example, adding more years or more regions in the hypersheet is done by updating the iteration domains of the corresponding splitters (they may even change dynamically), while the same change would be a long and complex chain of operations in a classical spreadsheet.

Duality Between Hypersheets and Textual Programs

As mentioned above, there is a close duality between hypersheets and mostly functional reactive programs (FRP). Splitters define data structures. The collection of all formulas, written as assignments to their corresponding cell, forms a reactive functional program over these data structures. Reactive functional programs can be compiled into imperative programs or byte-code.

In one direction, this duality means that a hypersheet can be used as a visual programming tool. Splitters, according to the present disclosure, allow users to define, in a visual way, complex data structures very similar to the ones found in the source code of traditional programming languages. Examples include sequences (lists, vectors), maps, sets, and tuples. The program defining statements operating on these complex data structures is exactly the collection of formulas found in the hypersheet in the "cell=formula" form. Such programs can be translated to source code in a mainstream programming language or compiled directly into object code using standard compilation techniques.

Thus, a hypersheet can be seen as a truly visual programming language. In this sense, the present disclosure provides a technique for enabling so-called end-user development, which is a key to the productivity of software development in large organizations.

In the other direction, this duality means that the collection of data structures defined in an existing program source code can be automatically turned into a hypersheet structure, and program statements turned into cell formulas.

Automatically generating a hypersheet from a program source code provides a mean for rapid prototyping. The visual aspect is useful for understanding the structure of data being designed, for a first assessment of program results, and for communicating and collaborating with other project stakeholders.

Since a hypersheet has an intimate knowledge of its dual program, it can link directly to a running instance of the program and display actual data values in real time. This is useful for rapid prototyping and visual debugging of complex data structures.

Compared to earlier approaches that draw a clear boundary between "spreadsheet code" and "program code," and put a lot of effort into translating the former into the latter, the present disclosure relies on the conceptual analogy between hypersheets and FRPs to blur the distinction between "spreadsheet code" and "program code," which can be directly interchanged for all practical purposes. The simplicity of this duality is due to the combination of the recursive multi-dimensional structure of hypersheets and the ability of the formula language to express operations on structured collections of data.

Connection with Databases

An important case of hot data linking is a database connection. A typical usage pattern of the present disclosure is to display and possibly modify databases. Conceptually, a relational database is a set of tables, each table being a set of tuples (while a non-relational database such as NoSQL is simply a map from keys to values). A database table is easily represented in one structured cell using two orthogonal splitters, a tuple splitter that iterates over the columns of the table, and an iterator splitter that iterates over the rows of the table. The formula defining the contents of the structured cell is a simple database query that retrieves the data. Note that the query can be performed in a lazy fashion, since only the data values that may affect the current display are required.

Such a hypersheet structure can be easily derived from a database schema. Reciprocally, a hypersheet with the appropriate structure can be easily turned into a database schema.

There is a direct connection between database queries and the comprehension expressions found in the formula language. In "Towards an effective calculus for object query languages" by Fegaras L. & Maier D.; Proceedings of the 1995 ACM SIGMOD international conference on Management of data (pp. 47-58); San Jose; Calif.; US (the reference is incorporated herein by reference) there is provided a systematic way to go from one to the other, in either direction. A spreadsheet (hypersheet) formula referring to tables of tuples can be translated directly into a database query, and vice-versa. In particular, the hypersheet can automatically generate the database queries required to view and update the database. Lazy evaluation in the formula language means that viewing a large database does not imply loading all of its data in memory.

Relation to Visual Box Languages Such as TeX, HTML, and CSS

The visual model of hypersheets, namely recursively embedded boxes, is very similar to the box model of the TeX document preparation system, to the standard document model of the web (HTTP (Hypertext Transfer Protocol) and CSS (Cascading Style Sheets)), and to the widget model of modern graphical user interfaces.

This makes it easy to export a hypersheet model for publishing as a web document. The structure of the hypersheet is translated to an HTML document structure by recursively turning each cell into the appropriate HTML constructs. The computational aspect, when present, is obtained by translating the hypersheet's dual functional reactive program into a standard web scripting language, such as JavaScript, using standard compilation techniques. A similar export scheme can be used for generating text documents or graphical user interfaces for a software application.

In this sense, the method of structuring a hypersheet using splitters can be used as a tool for web design or other structured document design. It should be noted that cells in a one-dimensional structure may be displayed as an in-line text flow, like HTML text elements or TeX boxes (rather than in a strictly formatted grid), in order to provide a visual experience close to text formatting.

The similarity of the hypersheet visual model with the HTML box model has another benefit in that it makes it possible to apply a standard Cascading Style Sheets (CSS) style sheet directly to a hypersheet, thereby separating contents and visual layout. Layout can also be defined by specific formulas (formulas that return CSS-like rendering information) at the level of each cell.

Hardware Implementations

Figure 13:
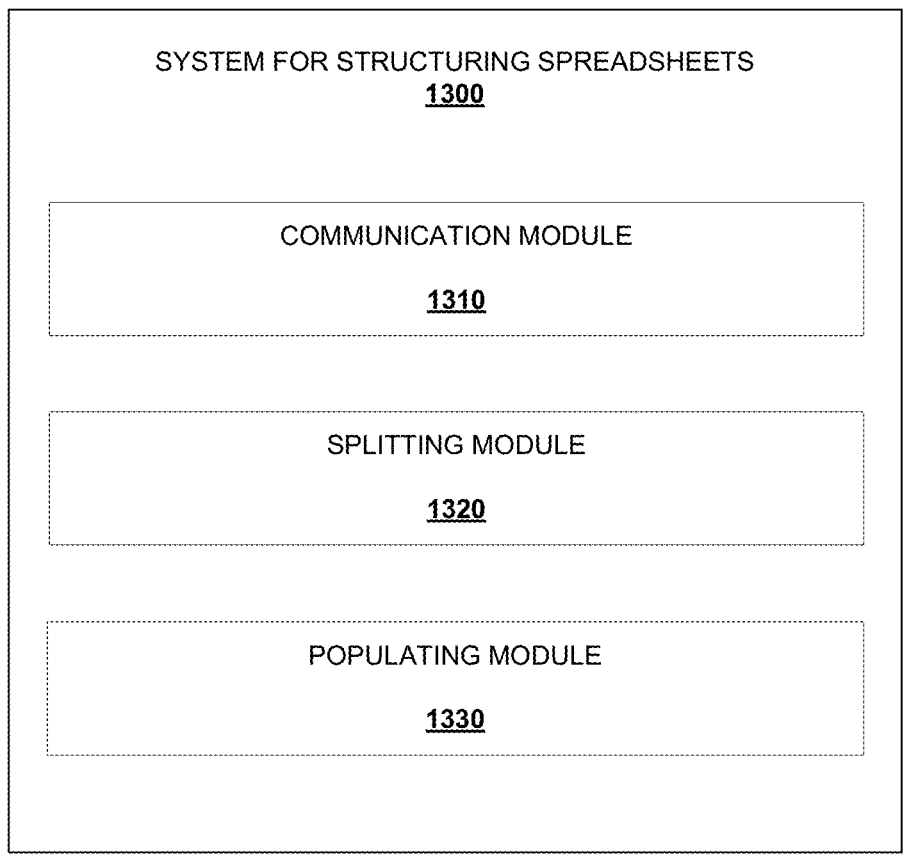
FIG. 13 shows a diagram of a system for structuring a hypersheet, according to an example embodiment.

Referring now to FIG. 13, the figure shows a diagram of a system 1300 for structuring hypersheets, according to an example embodiment. The system 1300 can include hardware (e.g., a computer, processor, controller, dedicated logic, programmable logic, chip, or any combination thereof) and software (e.g., firmware, processor-implementable code), or a combination of both. The system 1300 may refer to a computer, a laptop, a tablet computer, a portable computing device, a Personal Digital Assistant (PDA), a handheld cellular phone, a mobile phone, a smart phone, a handheld device, or any other electronic device.

In the embodiment shown, the system 1300 for structuring hypersheets may comprise a communication module 1310, a splitting module 1320, and a populating module 1330. In other embodiments, the system 1300 for structuring spreadsheets may include additional, fewer, or different modules for various applications. Furthermore, all modules can be integrated within a single system, or, alternatively, can be remotely located and optionally be accessed via a third party.

According to example embodiments, the communication module 1310 may be configured to receive and process users' requests to split cells. Each user request may comprise an identification of the at least one target cell to be split. For example, when operating in a hypersheet, the user may merely select one or more cells to be split by using a pointing device such as a computer mouse or a keyboard. The user requests may also comprise splitting parameters, which identify how selected (target) cells shall be split. In some embodiments, splitting parameters may include a number of new cells to be embedded into the target cells, a number of columns of new cells, and a number of rows of new cells. As mentioned, the splitting procedure is performed with the help of splitting operators, and said splitting parameters may define which one of the splitting operators is to be applied and how. In general, splitting operators may refer to one or more of a vertical splitter and/or a horizontal splitter, either structured or unstructured, and any combination thereof.

With continuing reference to FIG. 13, the splitting module 1320 can be configured to create one or more new cells and embed them into, or instead of, the target cells, in accordance with the splitting parameters. In other words, the splitting module 1320 applies a splitter operator selected in accordance with the user selection and defined splitting parameters to the hypersheet. This results in one or more new cells being created. In addition, it should be understood, splitting operators may be applied to these new cells as well in order to create new ones. Accordingly, multi-dimensional and recursive hypersheets may be created.

The splitting module 1320 can be further configured to generate indices for every new cell. The indices can be associated with indices of the corresponding target cell. For example, when the hypersheet has an alphanumeric indexation system, a target cell may have an index [B,5]. If this is the case, indices for two new cells embedded with this target cell may be, for example, as follows: [B,5][A,1] and [B,5][A,2]. Those skilled in the art would appreciate that various different indexation systems can be applied to the hypersheet and its cells.

With continuing reference to FIG. 13, the populating module 1330 may be configured to enable the user to populate cells (target or new) with objects such as numbers, text, images, media content, widgets, references, and so forth, and/or formulas. In general, each new cell may behave similar to the original (parent) cell, and may, for example, inherit properties of the original cell.

According to various embodiments, the system 1300 for structuring hypersheets may facilitate creation of computer-implemented programs in a source or object code form based on the splitting operators and formulas present in electronic documents. Such electronic documents can be created with the help of the system 1300 for structuring hypersheets based on the splitting operators and formulas used in a certain computer-implemented program or program code.

In addition, it should be mentioned that the system 1300 for structuring hypersheets may facilitate generation of various database schemas and database queries that may correspond to the splitting operators and/or formulas present in electronic documents. Furthermore, the system 1300 for structuring hypersheets may facilitate generation of electronic documents corresponding to these database schemas and/or database queries.

According to various embodiments, the system 1300 for structuring hypersheets may facilitate generation of one or more web pages whose structure and dynamic behavior may correspond to the splitting operators and/or formulas present in the corresponding electronic document.

Figure 14:
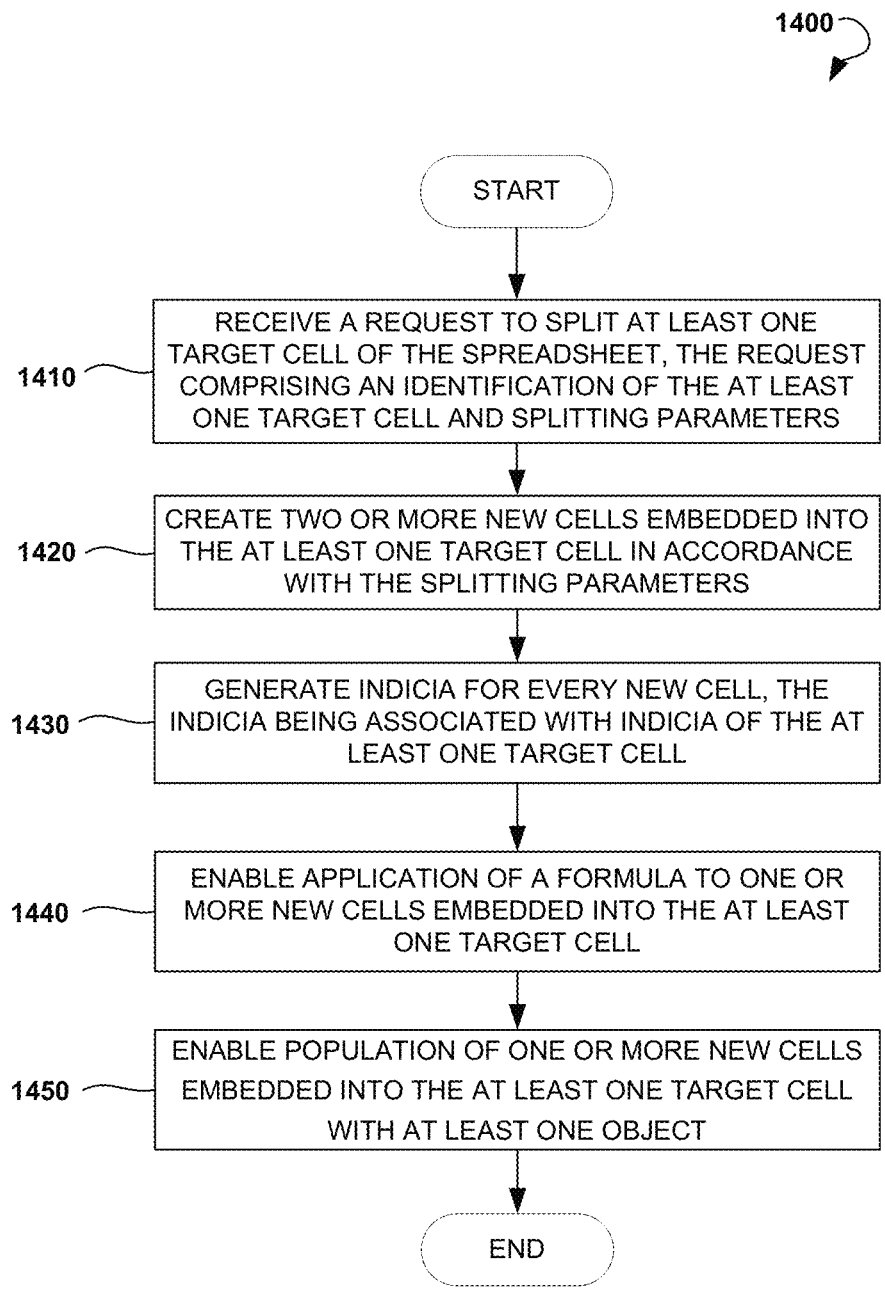
FIG. 14, the figure shows a process flow diagram illustrating a method for structuring electronic documents having an ordered set of cells, according to an example embodiment.

With reference to FIG. 14, the figure shows a process flow diagram showing a method 1400 for structuring hypersheets having an ordered set of cells, according to an example embodiment. The method 1400 may be performed by processing logic that may comprise hardware (e.g., dedicated logic, programmable logic, and microcode), software (such as software run on a general-purpose computer system or a dedicated machine), or a combination of both. In one example embodiment, the processing logic resides at the system 1300 for structuring hypersheets. In particular, the method 1400 can be performed by the various modules discussed above with reference to FIG. 13. Each of these modules can comprise processing logic. It will be appreciated by one of ordinary skill in the art that examples of the foregoing modules may be virtual, and instructions said to be executed by a module may, in fact, be retrieved and executed by a processor. The foregoing modules may also include memory cards, servers, and/or computer discs. Although various modules may be configured to perform some or all of various steps described herein, fewer or more modules may be provided and still fall within the scope of example embodiments.

With continuing reference to FIG. 14, the method 1400 may commence at operation 1410 with receiving a request to split at least one target cell of the hypersheet. The request may comprise an identification of the at least one target cell to be split and the splitting parameters defined by a user. In some embodiments, the identification of the at least one target cell to be split may be obtained by receiving a user selection of one or more cells that the user wants to split. The splitting parameters may also be defined by the user once he or she selects certain hypersheet cells for further splitting. The splitting parameters, in general, define how the splitting shall be performed, and may include a number of new cells created and how they should be organized (i.e., a number of rows and a number of columns). Any additional parameters may be applied in this case. For example, parameters may include a request to define if the target cell or cells comprise an object or a formula, and if so, the user may be prompted to define the splitting parameters by indicating whether the user wants to keep the object or formula. In an example, the object or formula of the target cell may be automatically stored in a first new cell when the target cell is split. In yet another example, when the target cell is split, the object or formula may be stored in all new cells.

The method 1400 further proceeds to operation 1420, when one or more new cells are created and embedded into the at least one target cell in accordance with the splitting parameters. The process of splitting and creating new cells was described above in detail. At operation 1430, indicia for every new cell are generated and applied to the new cells. These indices can be associated with indices of the at least one target cell and, in general, may replicate the indexing system of the shypersheet.

With continuing reference to FIG. 14, the method 1400 may further continue to operation 1440, when the user is enabled to populate one or more new cells embedded into the at least one target cell with at least one object. Objects may refer to numbers, text, images, videos, widgets, and so forth. In some embodiments, the population may be performed automatically with objects previously stored in the at least one target cell. Similarly, at operation 1450, the user is enabled to populate one or more new cells embedded into the at least one target cell with at least one formula. Formulas may operate with content stored both in original and new cells. For example, the formula SUM( . . . ) may be applied to count numbers stored either in new cells, in new and original cells, or the original cells only. Thus, original and new (embedded) cells may be interrelated and such cells may have reference to each other. Hence, hypersheets can be created and/or structured.

Figure 15:
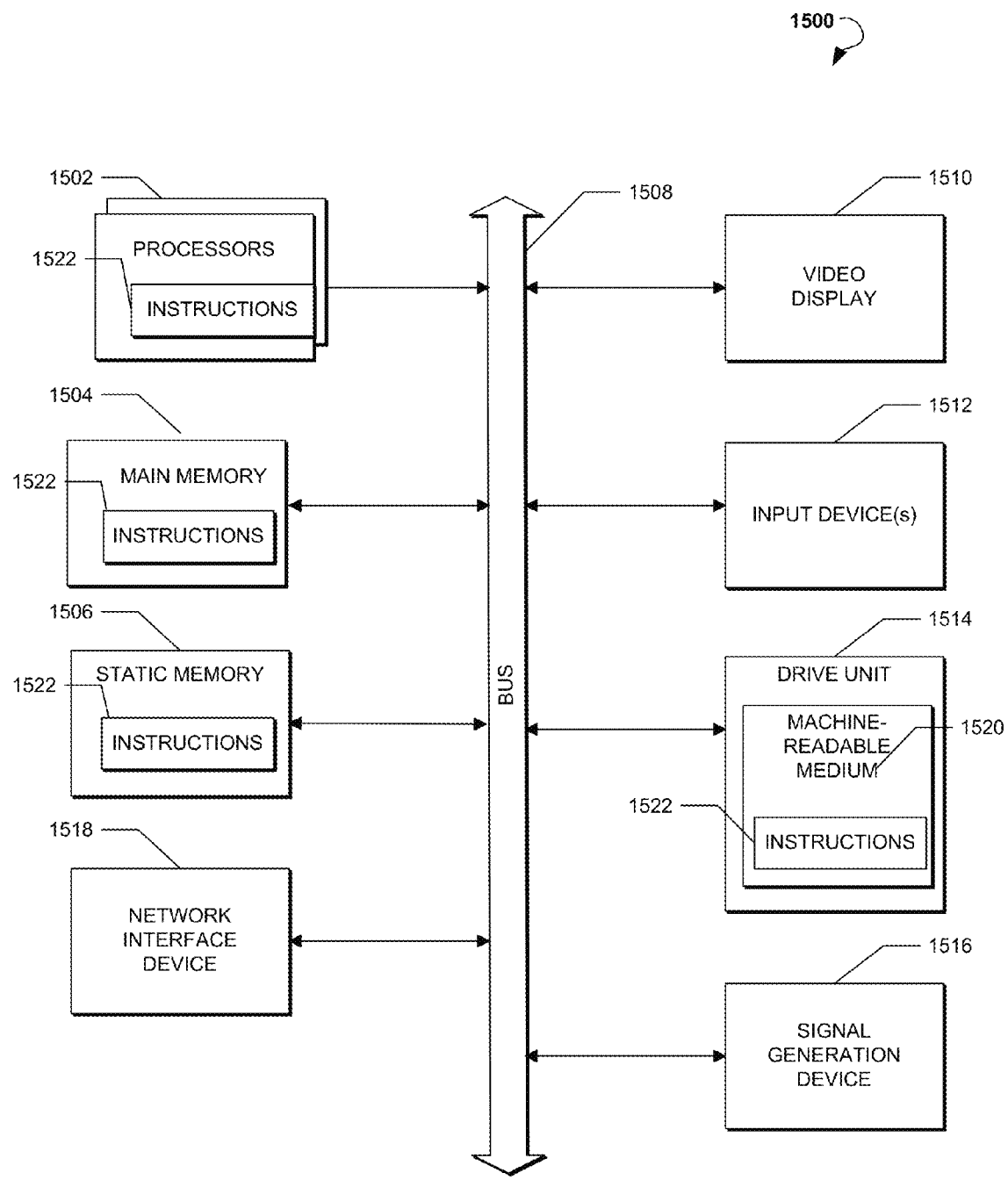
FIG. 15 is a diagrammatic representation of an example machine in the form of a computer system within which a set of instructions, for the machine to perform any one or more of the methodologies discussed herein, is executed.

FIG. 15 shows a diagrammatic representation of a computing device for a machine in the example electronic form of a computer system 1500, within which a set of instructions for causing the machine to perform any one or more of the methodologies discussed herein can be executed. In example embodiments, the machine operates as a standalone device or can be connected (e.g., networked) to other machines. In a networked deployment, the machine can operate in the capacity of a server or a client machine in a server-client network environment or as a peer machine in a peer-to-peer (or distributed) network environment. The machine can be a personal computer (PC), a tablet PC, a set-top box (STB), a PDA, a cellular telephone, a portable music player (e.g., a portable hard drive audio device, such as an Moving Picture Experts Group Audio Layer 3 (MP3) player), a web appliance, a network router, a switch, a bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1500 includes a processor or multiple processors 1502 (e.g., a central processing unit (CPU), a graphics processing unit (GPU), or both), and a main memory 1504 and a static memory 1506, which communicate with each other via a bus 1508. The computer system 1500 can further include a video display unit 1510 (e.g., a liquid crystal display (LCD) or cathode ray tube (CRT)). The computer system 1500 also includes at least one input device 1512, such as an alphanumeric input device (e.g., a keyboard), a cursor control device (e.g., a mouse), a microphone, a digital camera, a video camera, and so forth. The computer system 1500 also includes a disk drive unit 1514, and a signal generation device 1516 (e.g., a speaker).

The disk drive unit 1514 includes a computer-readable medium 1520 which stores one or more sets of instructions and data structures (e.g., instructions 1522) embodying or utilized by any one or more of the methodologies or functions described herein. The instructions 1522 can also reside, completely or at least partially, within the main memory 1504 and/or within the processors 1502 during execution thereof by the computer system 1500. The main memory 1504 and the processors 1502 also constitute machine-readable media.

While the computer-readable medium 1520 is shown in an example embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media. Such media can also include, without limitation, hard disks, floppy disks, flash memory cards, digital video disks, random access memory (RAM), read only memory (ROM), and the like.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software programs for implementing the present method can be written in any number of suitable programming languages such as, for example, Java and any of its extensions such as OptimJ, general-purpose programming languages such as C, C++, C#, Perl, Visual Basic or Visual Basic Script, SQL, or other compilers, assemblers, interpreters or other computer languages or platforms.

Thus, methods and systems for structuring hypersheets have been described. These methods and systems provide a useful tool to create and structure multi-dimensional and recursive hypersheets having greater flexibility with structured data. The present disclosure also enhances methods for interaction between the hypersheets and external applications. And lastly, the disclosed approaches enable the creation of hypersheets that can be easily debugged and audited.

Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A computer-implemented method of structuring an electronic document having a recursively ordered set of cells, the method comprising:
   receiving a request to split a range of cells of the electronic document, the request comprising an identification of the range of cells and splitting parameters; and
   creating one or more new cells recursively embedded into the range of cells, in accordance with the splitting parameters, thereby defining recursive data structures corresponding to the one or more new cells embedded into the range of cells.

2. The method of claim 1, wherein the splitting parameters comprise one or more of a number of new cells to be embedded into the range of cells, a number of columns of new cells, and a number of rows of new cells.

3. The method of claim 1, wherein the range of cells and the one or more new cells are editable cells and configured to be populated with one or more formulas or objects.

4. The method of claim 3, wherein the one or more objects comprising one or more of the following: a text, an image, a video, a widget, and a number.

5. The method of claim 4, wherein the one or more objects are computed with a formula associated with the range of cells.

6. The method of claim 1, further comprising generating implicit formulas, values or indices for every new cell.

7. The method of claim 1, wherein the one or more of new cells are being ordered in a multi-dimensional grid nested into the range of cells.

8. The method of claim 1, wherein the request to split the range of cells of the electronic document comprising at least one splitting operator.

9. The method of claim 8, wherein the at least one splitting operator comprising one or more of a vertical splitter and a horizontal splitter, each splitter being either a structured splitter or an unstructured splitter.

10. The method of claim 8, wherein two or more splitting operators are configured to be recursively embedded into each other.

11. The method of claim 8, wherein splitters are defined interactively via a graphical user interface.

12. The method of claim 8, wherein properties of previously defined splitters are modified interactively.

13. The method of claim 8, wherein a structured splitter is reconfigured into an unstructured splitter, and vice versa.

14. The method of claim 8, wherein the at least one splitting operator defining a lexical scope.

15. The method of claim 8, wherein the at least one splitting operator is configured to bind objects to variable names for all cells belonging to a lexical scope of the at least one splitting operator.

16. The method of claim 8, further comprising generating a processor-implemented program having data structures corresponding to the at least one splitting operator and having code corresponding to the at least one formula associated with the electronic document.

17. The method of claim 8, wherein the electronic document is structured automatically based on an input source code so that the at least one splitting operator corresponds to data structures and formulas associated with the input source code.

18. The method of claim 8, further comprising generating at least one database schema corresponding to the at least one splitting operator associated with the electronic document, and generating at least one database query corresponding to at least one formula associated with the electronic document.

19. The method of claim 8, wherein the electronic document is structured automatically based on at least one input database schema and one or more database queries, such that the at least one splitting operator corresponds to the at least one database schema and formulas correspond to the one or more database queries.

20. The method of claim 8, further comprising generating one or more web pages whose structure corresponds to the at least one splitting operators associated with the electronic document.

21. The method of claim 1, further comprising enabling application of a formula to one or more new cells embedded into the range of cells.

22. The method of claim 1, wherein the formula comprising one or more comprehension expressions.

23. The method of claim 1, further comprising enabling population of one or more new cells embedded into the range of cells with at least one object.

24. The method of claim 1, wherein the electronic document having a recursively ordered set of cells comprising one or more of a spreadsheet, a hypersheet, and a web page.

25. A system for structuring an electronic document having a recursively ordered set of cells, the system comprising:
   a communication module configured to receive a request to split a range of cells of the electronic document, the request comprising an identification of the range of cells and splitting parameters; and
   a splitting module configured to create one or more new cells recursively embedded into the range of cells, in accordance with the splitting parameters, thereby defining recursive data structures corresponding to the one or more new cells embedded into the range of cells.

26. The system of claim 25, wherein the splitting module is further configured to generate indices for every new cell, with the indices associated with indices of the at least one target cell.

27. The system of claim 25, further comprising a populating module configured to enable application of a formula to one or more new cells embedded into the range of cells.

28. The system of claim 27, wherein the populating module is further configured to enable population of one or more new cells embedded into the range of cells with at least one object.

29. The system of claim 25, wherein the one or more of new cells are being ordered in a multi-dimensional grid nested into the range of cells.

30. The system of claim 25, wherein the request to split the range of cells of the electronic document comprises a splitting operator.

31. The system of claim 30, wherein the splitting operator comprising one or more of a vertical splitter and a horizontal splitter, each splitter being either structured or unstructured.

32. A non-transitory computer-readable storage medium having instructions stored thereon, which when executed by one or more processors, cause the one or more processors to:
receive a request to split a range of cells of the electronic document, the request comprising an identification of the range of cells and splitting parameters; and
create one or more new cells recursively embedded into the range of cells, in accordance with the splitting parameters, thereby defining recursive data structures corresponding to the one or more new cells embedded into the range of cells.

* * * * *